United States Patent [19]

Penn

[11] Patent Number: 4,622,675
[45] Date of Patent: Nov. 11, 1986

[54] FORCED TRANSPORT MOLECULAR GAS LASER AND METHOD

[75] Inventor: Wayne M. Penn, Cartersville, Ga.

[73] Assignee: P.R.C., Ltd., Kennesaw, Ga.

[21] Appl. No.: 518,700

[22] Filed: Jul. 29, 1983

[51] Int. Cl.[4] .............................................. H01S 3/22
[52] U.S. Cl. ...................................... 372/58; 372/81; 372/61; 372/92; 313/231.61; 313/634
[58] Field of Search ....................... 372/81, 83, 61, 55, 372/90, 58, 59, 82, 31; 313/231.41, 231.61, 634, 611

[56] References Cited

U.S. PATENT DOCUMENTS

| 3,748,594 | 7/1973 | Pugh | 372/82 |
| 3,775,700 | 11/1973 | Garman et al. | 372/61 |
| 4,287,487 | 9/1981 | Kuwabora et al. | 372/55 |
| 4,351,052 | 9/1982 | Sasaki et al. | 372/55 |
| 4,470,144 | 9/1984 | Sano et al. | 372/61 |
| 4,500,998 | 1/1985 | Kuwabora et al. | 372/58 |
| 4,550,409 | 10/1985 | Kaye | 372/87 |

FOREIGN PATENT DOCUMENTS 3031692 4/1982 Fed. Rep. of Germany ........ 372/55

OTHER PUBLICATIONS

Artamonov et al., "Investigation of an Electric Discharge Chamber of a Fast Flow CO2 Laser", *Sov. Jour. Quant. Elect.*, vol. 7, No. 3, Mar. 1977.

*Primary Examiner*—Leon Scott, Jr.
*Attorney, Agent, or Firm*—Antonelli, Terry & Wands

[57] ABSTRACT

A forced transport, electrically excited molecular gas laser is disclosed. The laser includes a flow path for a gaseous lasing medium at high pressure such as 50 to 150 Torr, a blower for moving the gaseous lasing medium at high speed along the flow path, electrodes for electrically exciting the moving gaseous lasing medium along an active discharge length of the flow path to create a plasma for lasing, and an expansion chamber along the flow path in the vicinity of the active discharge length of the flow path for rapidly expanding the moving gaseous lasing medium to stir the plasma and provide a more uniform and stable discharge. The gas laser allows for high pressure and fast axial flow operation resulting in a compact design which produces high power optical output with uniform and stable mode characteristics.

31 Claims, 16 Drawing Figures

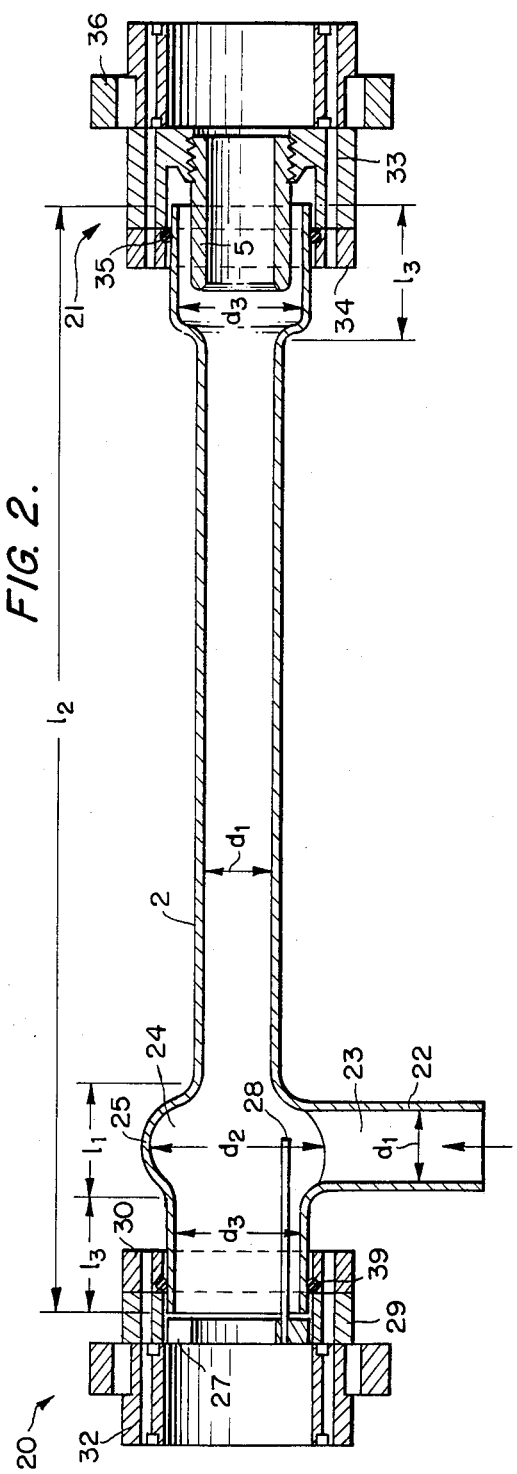
FIG. 2.
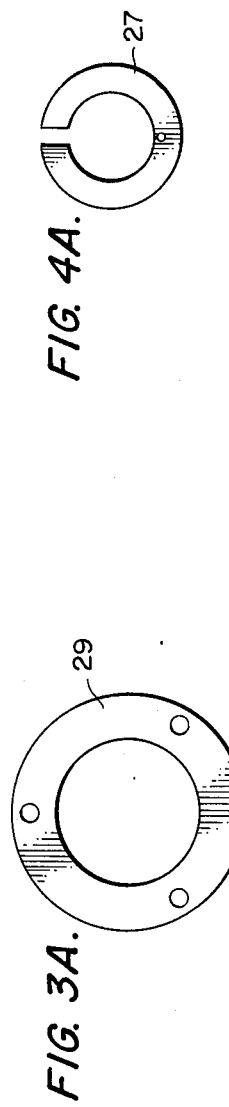
FIG. 4A.
FIG. 4B.
FIG. 3A.
FIG. 3B.

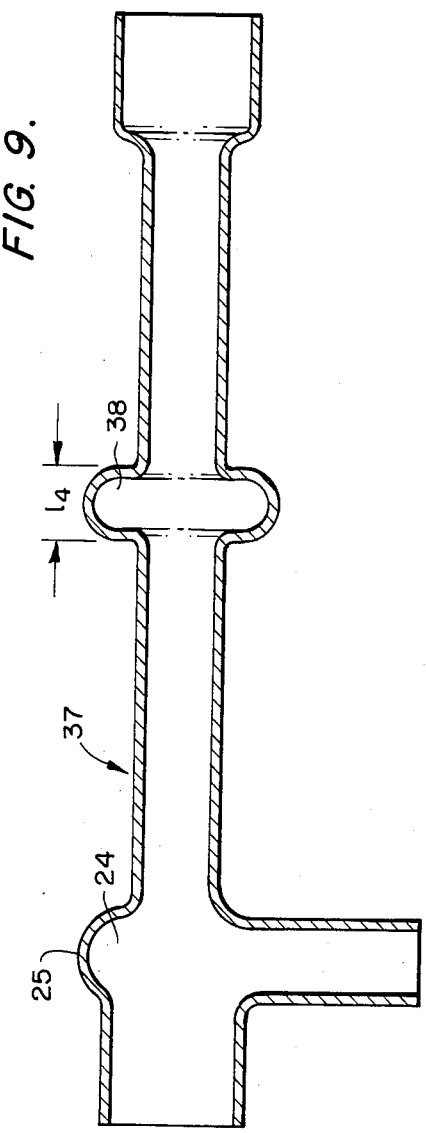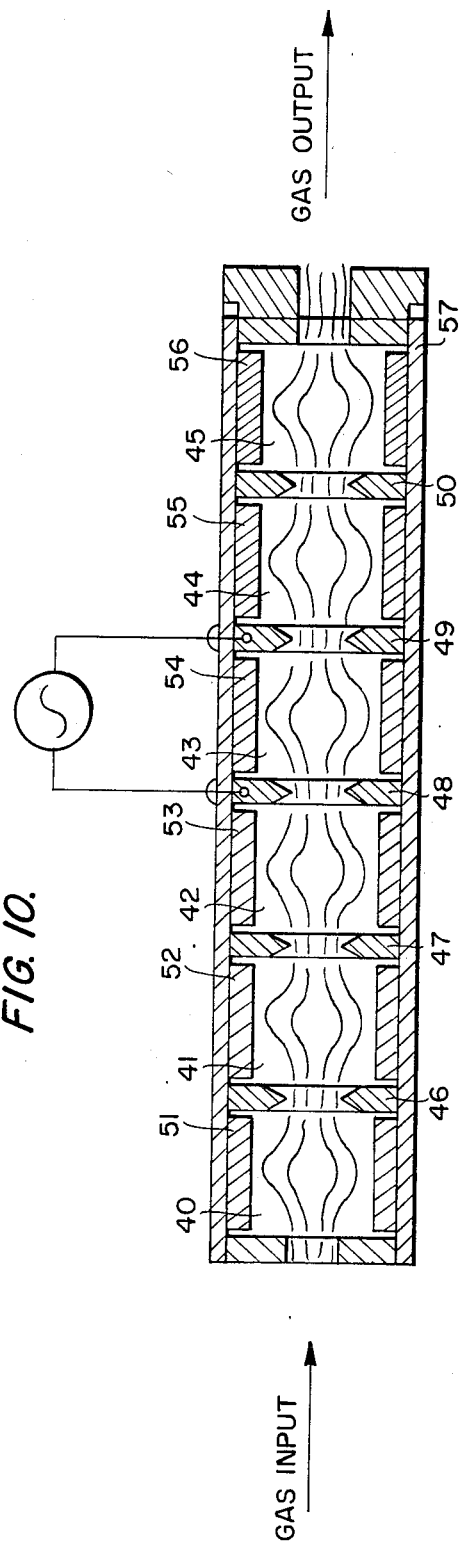

FORCED TRANSPORT MOLECULAR GAS LASER AND METHOD

BACKGROUND AND SUMMARY OF THE INVENTION

The present invention relates to a forced transport, electrically excited molecular gas laser and a method of improving the discharge uniformity in such a laser. More particularly, the invention is directed to an improved high power forced transport, electrically excited molecular gas laser having a large volume discharge in a gaseous medium at a pressure of at least 50 Torr and to a method of improving the discharge uniformity thereof.

High power molecular gas lasers, such as fast axial flow $CO_2$ lasers, must be able to maintain uniform discharge properties at vacuum and pressure as compared to conventional gas lasers. However, as the gas pressure increases to high pressures of between 50 and 150 Torr, discharge uniformity and arc formation become limiting parameters. That is, it is generally impossible to strike a large cross sectional area discharge between the two parallel plates in such high pressure gases. Instead, a single arc will be established. The diameter of the arc is restricted by (a) electron emission at the cathode due to bombardment of positive ions, and (b) the electrodynamics of the column; increasing current, increases ionization which decreases the potential gradient and constricts the column as discussed in U.S. Pat. Nos. 3,735,284 and 3,795,838.

To promote discharge uniformity and restrict arc formation it has been proposed in the aforementioned U.S. patents to control the ion spacial distribution, and therefore indirectly the electron spacial distribution in large volume discharges, by means of aerodynamic forces created by partially obstructing the large volume discharges. More specifically, in the identified patents, horizontal and vertically extending rods are placed transverse to the laser gas flow path to create vortices in the gaseous flow to rapidly diffuse the plasma. Further mixing also results from the placement of nozzles in the gas flow which shock supersonic flow back to subsonic. However, the provision of such devices in the gaseous lasing medium flow path is problematical in that they reduce the cross sectional area of the flow passage which increases the pressure drop along the flow passage. This in turn reduces the operating efficiency of the laser because, for a given blower capacity, an increased pressure drop results in a decrease in the rate at which the gaseous lasing medium is moved through the discharge length of the laser. In particular, lower gas flow rates reduce the power output of the laser because they reduce the mass flow rate. Lower gas flow rates also reduce the cooling from the gas flow which likewise limits the laser output capacity since once the gas temperature exceeds 300° C., for example, thermal bottlenecks occur and the gas is too hot to lase.

An object of the present invention is to provide a high power, forced transport, electrically excited molecular gas laser which provides improved ionization and cooling while avoiding the aforementioned problems of the prior art devices.

A further object of the invention is to provide an improved forced transport, electrically excited molecular gas laser having a large volume discharge in a gaseous medium at a pressure of at least 50 Torr which allows high pressure and fast axial flow operation, the laser having a compact design which produces high power optical output with uniform and stable mode characteristics.

These and other objects of the invention are attained by providing a forced transport, electrically excited molecular gas laser having a large volume discharge and a gaseous lasing medium at a pressure of at least 50 Torr comprising means defining a flow path for a gaseous lasing medium, a gaseous lasing medium having a pressure of at least 50 Torr contained in the flow path, means for moving the gaseous lasing medium at high speed along the flow path, means for electrically exciting the moving gaseous medium along an active discharge length of the flow path to create a plasma for lasing, and wherein the means defining the flow path includes expansion chamber means in the vicinity of the active discharge length of the flow path for rapidly expanding the moving gaseous medium to stir the plasma and provide a uniform and stable discharge.

While it is known to provide enlargements such as bell-shaped end portions in laser discharge tubes to accommodate electrodes, these areas are substantially obstructed by the electrodes or other structures contained therein. However, it has been discovered that the provision of substantial additional, essentially unobstructed, space in the form of an expansion or ionization chamber in the vicinity of the active discharge length of the flow path effectively mixes the ions and the plasma as the gas moves into and out of this chamber via the adjacent, relatively smaller cross sectional area portions of the flow path. According to the invention, a single expansion or ionization chamber may be provided at the upstream, anode end of the laser flow path or several expansion chambers may be provided along the length of the active discharge in the laser flow path to increase the permissible active length by reducing the tendency for downstream arcing.

According to a disclosed, preferred embodiment the means defining a flow path for the gaseous lasing medium includes an elongated laser discharge tube with a bore for the passage of the gaseous lasing medium. The expansion chamber means is defined by an enlarged portion of the laser discharge tube bore located intermediate the ends of the tube. The enlarged portion of the laser discharge tube has a cross sectional area at least approximately six times that of the adjacent bore for effecting the rapid expansion of the moving gaseous medium and stirring of the plasma.

According to a second disclosed embodiment of the invention the laser discharge tube includes a plurality of expansion chamber means in the form of respective enlarged portions of the bore of the tube spaced along the length of the tube to periodically rapidly expand the moving gaseous lasing medium to stir the plasma. Equal potential means may be provided in the expansion chamber means for establishing a uniform electric field across the plasma to further increase the output power or capacity of the laser. Additional power from the laser can also be obtained according to the invention by connecting at least two of the equipotential means to radio frequency excitation means to electrically excite the gaseous medium moving in the discharge tube.

In the several disclosed embodiments the primary electrical excitation of the moving gaseous medium along an active discharge length of the flow path is attained by the application of direct current across an anode and a cathode positioned in spaced relationship in the discharge tube along the flow path. The elongated discharge tube includes a gas inlet fitting extending transverse to the longitudinal direction of the discharge tube. The inlet fitting defines an inlet bore portion for the passage of the gaseous lasing medium. The inlet bore portion communicates directly with an expansion chamber means provided in the vicinity of the anode. In one form of the invention, an additional expansion chamber means is provided downstream intermediate the anode and cathode.

The anode is preferably in the form of a rod with one end portion of the rod extending into the expansion chamber means whereby the expansion chamber means is essentially unobstructed to permit the rapid expansion therein of the moving gaseous lasing medium. Anode support means are provided for supporting the anode rod from its end opposite the one end. The anode support means is positioned at an end of the elongated discharge tube. The cathode in the illustrated embodiments is an annular member which encircles the flow path. The cathode is preferably removably mounted in an enlarged end portion of the discharge tube by cathode support means connected to an end of the discharge tube.

A method according to the invention for improving the discharge uniformity in a forced transport, electrically excited molecular gas laser having a large volume discharge in a gaseous medium at a pressure of at least 50 Torr comprises the steps of moving a gaseous lasing medium having a pressure of at least 50 Torr at high speed along the flow path, electrically exciting the moving gaseous medium along an active discharge length of the flow path to create a plasma for lasing, and rapidly expanding the gaseous medium in an expansion chamber provided along the flow path in the vicinity of the active discharge length of the flow path to stir the plasma and provide a uniform and stable discharge.

Further, according to the invention, the step of rapidly expanding the moving gaseous medium may be performed a plurality of times as the gaseous medium moves along the active discharge length of the flow path to thereby increase the effective length of the laser and enhance the laser output. Laser output can be further enhanced by the additional step of equalizing the electrical field across the plasma between the rapid expansions of the moving gaseous medium.

These and other objects, features, and advantages of the present invention will become more apparent from the following description when taken in connection with the accompanying drawings which show, for purposes of illustration only, several embodiments in accordance with the invention.

BRIEF DESCRIPTION OF THE DRAWINGS

FIG. 2 is a cross sectional view taken along the longitudinal center axis of a laser discharge tube of FIG. 1 and showing the electrodes and electrode support assemblies;

FIG. 3A is a front elevational view of an electrode within which the stinger anode of the laser discharge tube of FIG. 2 is press fitted;

FIG. 3B is a edge side view of the electrode of FIG. 3A;

FIG. 4A is a front elevational view of the stinger anode of the laser discharge tube of FIG. 2;

FIG. 4B is an edge side view of the stinger anode of FIG. 4A;

FIG. 9 is a cross sectional view taken along the longitudinal center axis of a laser discharge tube according to a second embodiment of the invention; and FIG. 10 is a cross sectional view taken along the longitudinal center axis of a laser discharge tube according to a third embodiment of the invention.

DESCRIPTION OF THE DISCLOSED EMBODIMENTS

Figure 1:
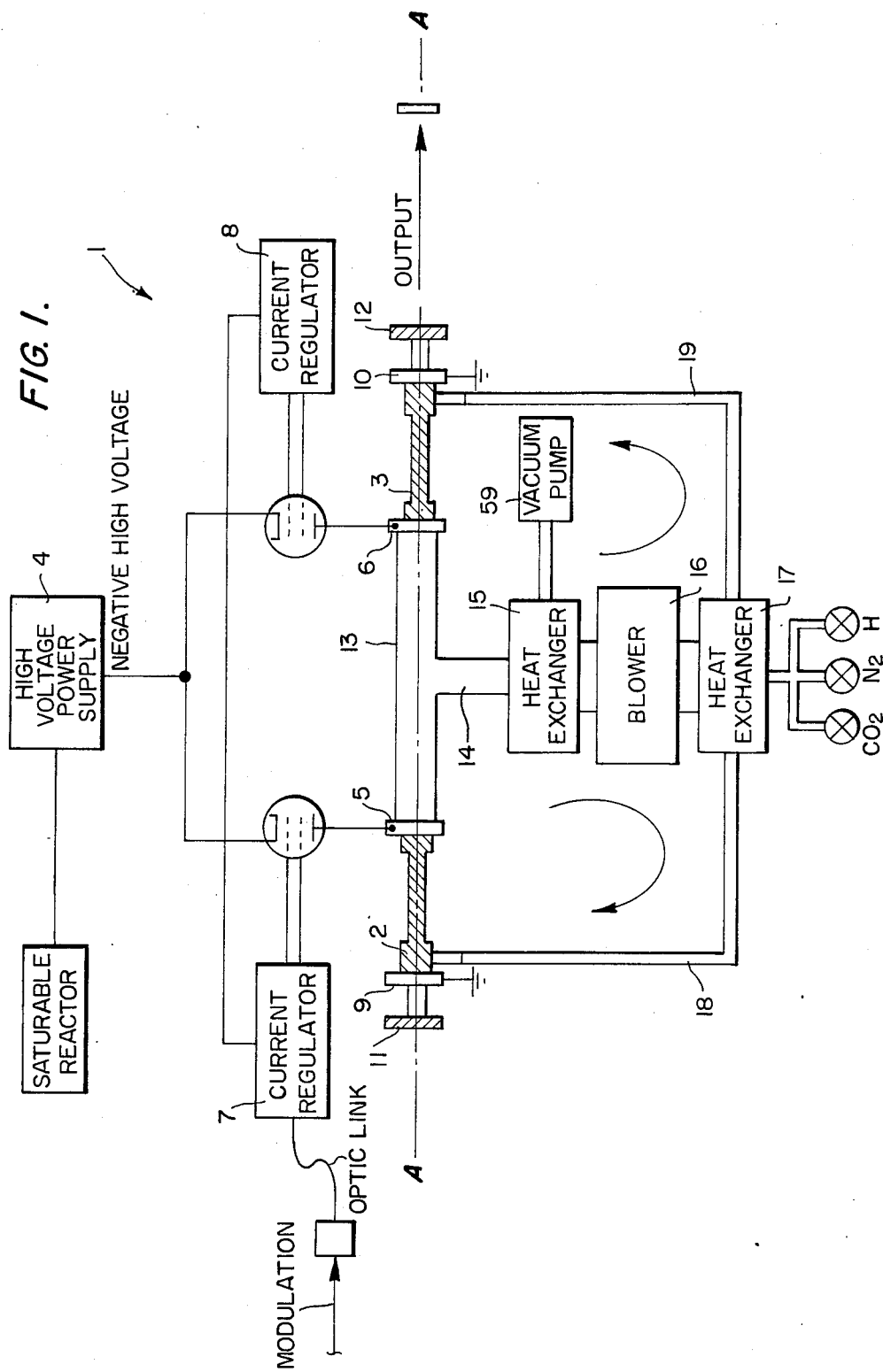
FIG. 1 is a schematic illustration of a forced transport, electrically excited molecular gas laser according to a preferred embodiment of the invention.

Referring now to the drawings, a forced transport, electrically excited molecular gas laser 1 according to the invention is shown in FIG. 1. The laser 1 is a high power $CO_2$ coaxial type gas flow laser wherein the laser beam axis, gas flow axis and electric discharge axis are coincident along axis A—A. As schematically shown in FIG. 1, the laser 1 comprises a pair of laser discharge tubes 2 and 3 positioned in spaced relationship on the axis A—A to define a single resonant optic cavity. A negative high voltage power supply 4 is connected to the cathodes 5 and 6 of the respective laser discharge tubes by way of current regulators 7 and 8. The anodes 9 and 10 of the discharge tubes are connected to ground as illustrated. A totally reflective mirror 11 connected to one end of the laser discharge tube 2 defines one end of the resonant optic cavity. A partially reflective mirror 12 is connected to the anode end of the laser discharge tube 3 to form the other end of the resonant optic cavity or discharge chamber.

An intermediate portion of the discharge chamber is formed by a gas conduit 13 extending between the adjacent cathode ends of the discharge tubes. The conduit 13 is T-shaped with a depending outlet fitting 14 for conveying the moving gaseous lasing medium from the downstream ends of the discharge tubes to a first heat exchanger 15, a blower 16 and a second heat exchanger 17. After the gas is cooled by heat exchangers 15 and 17 it is recycled to the upstream, anode ends of the discharge tubes via conduits 18 and 19 which complete the closed loop flow paths for the gas. The molecular gas, in this case a mixture of carbon dioxide, nitrogen and helium, is circulated at high speed through the closed loop flow paths which include the discharge tubes for obtaining a high power laser output and for cooling the laser. The blower moves the gas at speeds of at least 45 meters per second and typically just below the speed of sound or considerably above sonic speed if supersonic flow rates are employed. A vacuum pump 59 maintains the gas pressure relatively high, between 50 and 150

Torr, and typically about 100 Torr. The moving gas is electrically excited along an active discharge length of the flow path in each tube by the direct current high voltage between the anode and cathode therein to create a plasma for lasing.

The laser discharge tube 2 and the electrode mounting assemblies 20 and 21 associated therewith are illustrated in greater detail in FIG. 2. The elongated discharge tube 2 is a Pyrex precision bore tube with an inlet fitting 22 extending transverse to the longitudinal direction, axis A—A of the discharge tube and defining an inlet bore portion 23 for the passage of the gaseous lasing medium. The inlet bore portion 23 communicates directly with an annular expansion chamber 24 formed by a bulbous enlargement 25 in the tube 2 for rapidly expanding the moving gaseous lasing medium to stir the plasma and provide a uniform and stable discharge. In the illustrated embodiment the wall thickness of the Pyrex discharge tube 2 is approximately 1.7 mm with the inlet bore portion 23 and the active discharge length of the tube along axis A—A each having a uniform internal diameter $d_1$ of 17.6 mm. The internal diameter $d_2$ of the annular, bulbous expansion chamber 24 along the axis A—A is 42.6 mm. Thus, the expansion chamber is defined by an enlarged portion 25 of the laser tube bore located intermediate the ends of the tube with the enlarged portion of the bore having a cross sectional area along the bore of at least approximately six times that of the adjacent flow path bore for effecting rapid expansion of the moving gaseous medium and stirring of the plasma. The length $l_1$ of the bulbous expansion chamber along the axis A—A is 1.0 inch as compared with the overall tube length $l_2$ of 10.875 inches. While successful stirring and mixing are attained with an expansion chamber of this size, it is contemplated that the expansion chamber could be even larger relative to the flow path bore than in the illustrated embodiment and also that, depending upon gas flow rates, laser power output, etc., the necessary mixing and stirring action could be obtained with an expansion chamber smaller than that illustrated. Each end of the tube 2 is bell-shaped with an internal diameter $d_3$ of 31.6 mm for a distance $l_3$ of 1.25 inches along the axis A—A.

The anode 9 and cathode 5 for electrically exciting the moving gaseous medium along an active discharge length of the flow path located between them are positioned within the tube 2 in the bell-shaped end portions thereof as shown in FIG. 2. The anode 9 is in the form of a 2 inch long, 0.060 inch diameter tungsten welding rod supported in a bore 26 of brass base 27. The stinger anode 9 extends within the tube 2 in the longitudinal direction of the tube so that the inner end 28 of the anode rod is positioned in the expansion chamber 24 above the inlet bore portion 23 of inlet fitting 22. Brass base 27 of the stinger anode is press fitted into an aluminum anode ring 29. An aluminum mounting ring 30 with O-ring seal 31 is positioned on the discharge tube side of the anode ring 29 for sealingly connecting the discharge tube to the anode. An electrode ring 32 is also positioned on the side of the anode ring 29 away from the discharge tube 2 with the three adjacent rings 29, 30 and 32 having cooperating bores therethrough for receiving suitable fasteners (not shown) to connect the assembly. The mirror 11 shown in FIG. 1 is attached to the outer end of the electrode ring 32. The anode ring 29 is illustrated in greater detail in FIGS. 3A and 3B, the aluminum mounting ring 30 in FIGS. 6A and 6B and the aluminum electrode ring 32 in FIGS. 5A and 5B of the drawings. Because the stinger anode is in the form of a thin rod with only an end portion of the rod extending into the expansion chamber 24, the expansion chamber is essentially unobstructed to permit rapid expansion and stirring of the moving gaseous lasing medium within the chamber. The turbulent mixing of the gas from the bore portion 23 upon expansion into the larger volume chamber 24 mixes the ions at the stinger anode end of the tube 2 which results in a uniform discharge over the length of the laser tube.

Figure 5A:
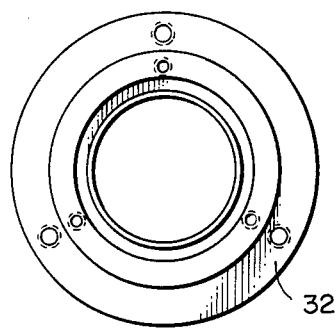
FIG. 5A is an end side view of an electrode ring of the anode mounting assembly of FIG. 2.
Figure 6A:
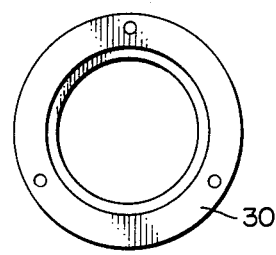
FIG. 6A is an end side view of another electrode ring of the anode mounting assembly of FIG. 2 which sealingly couples the end of the laser discharge tube in the electrode mounting assembly.
Figure 5B:
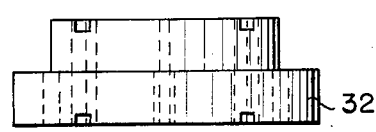
FIG. 5B is an edge side view of the electrode ring of FIG. 5A.
Figure 6B:
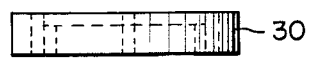
FIG. 6B is an edge side view of the electrode ring of FIG. 6A.
Figure 7A:
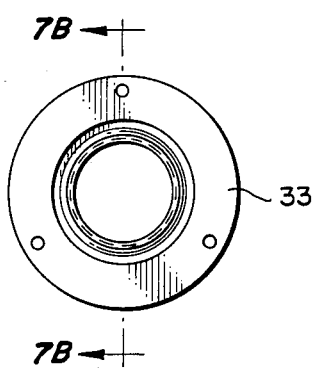
FIG. 7A is a front elevational view of a removable cathode ring of the laser discharge tube of FIG. 2.
Figure 8A:
FIG. 8A is a front end view of the removable cathode of the laser discharge tube of FIG. 2.
Figure 7B:
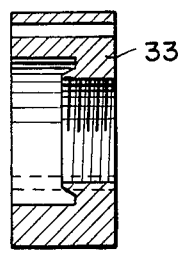
FIG. 7B is a cross sectional view of the removable cathode ring of FIG. 7A taken along the line VII—VII.
Figure 8B:
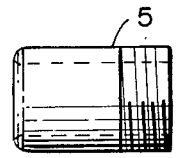
FIG. 8B is a side elevational view of the removable cathode of FIG. 8A.

The cathode 5 in the discharge tube 2 is an annular copper member which encircles the flow path as shown in FIGS. 2, 8A and 8B. The annular cathode is threadedly connected to a removable aluminum cathode ring 33, see FIGS. 7A and 7B, which in turn is supported on the end of the discharge tube 2 by a cathode mounting ring 34 with an O-ring seal 35 for sealing against the outer circumference of the tube. The cathode electrode assembly 21 further includes an electrode ring 36 of the type at the anode end as shown in FIGS. 5A and 5B. The mounting ring 34, cathode ring 33 and electrode ring 36 are joined by suitable fasteners (not shown) extending through cooperating bores in the rings. The gas conduit 13 illustrated in FIG. 1 is connected to the end of the electrode ring 36 for the return flow of the gas.

The cathode 5 of the invention prevents the rooting of the discharge into the rings which damages the metal and the O-ring seal. The cathode accomplishes this by pulling the ions into itself instead of the ring parts so that the discharge is contained with no rooting into the rings. Also, the cathode can be removed for cleaning if so needed. The laser discharge tube 3 and its electrodes and electrode mounting assemblies are constructed in a like manner as described above with respect to the discharge tube 2.

In the form of the invention illustrated in FIG. 9, the laser discharge tube 37 is the same as that shown in FIG. 2 except that it includes an additional annular, bulbous expansion chamber 38 downstream of expansion chamber 24 and intermediate the anode and cathode. With such an arrangement, the gaseous lasing medium is periodically rapidly expanded as it moves along the active discharge length of the tube between the anode and cathode so as to stir the plasma and provide a more uniform discharge. This extends the practical, operable length of the tube by extinguishing or eliminating arcing which can occur as a result of an ionization column traveling a long distance. Thus, the invention increases the permissible active length of the transport type laser tube. The length $l_4$ of the intermediate expansion chamber is 0.75 inch and its internal diameter is the same as that of the expansion chamber 24. The chamber 38 may be completely unobstructed during use to promote vigorous expansion and mixing of the moving gas. However, the downstream ionization chamber can contain an equipotential screen, disc or chamber made of a conducting or semiconducting type material. The equipotential member forces the electric field to be uniform in cross section which retards arc formation. This type of integration of ionization or expansion chambers according to the invention and equipotential chambers permits continuous scaling in size and volume of laser tubes for greater power output.

In order to obtain very high power laser outputs, such as 50 kw, from a laser, according to another embodiment of the invention, as depicted in FIG. 10, the discharge tube 39 is formed with a plurality of successive expansion chambers 40-45 along the length thereof with equipotential discs 46-50 being provided in or between the expansion chambers for repeatedly establishing a uniform electric field across the plasma to eliminate or prevent arcing. The equipotential discs 46-50 each have a bore therethrough which is coaxial with the bore in the discharge tube 39 and the discs actually function to partition the respective expansion chambers defined by annular ceramic members 51-56. The annular ceramic members and equipotential discs are retained within a ceramic tube 59. Electrical excitation of the gaseous lasing medium is accomplished with an anode and cathode of the type illustrated in FIG. 2 which are employed at the respective ends of the discharge tube. Supplemental excitation by radio frequency excitation across a pair of equipotential discs can also be employed as illustrated in FIG. 10. While the equipotential members in the discharge tube in FIG. 10 are in the form of discs, it is also understood that equipotential members in the form of screens or other configurations could be employed.

The multiple chamber laser tube of FIG. 10 represents a continuous application of ionization or expansion chambers and equipotential zones for high pressure, high power output implementation which is easy to fabricate and assemble. The radio frequency exciter 58 can directly couple, capacitively, or inductively to the equipotential zones, and these zones can be varied in length and shape in order to shape the field. The injected radio frequency field can be provided as additional ionization with the direct current excitation field as referred to above or with other forms of pumping, or it could be the sole source of pumping for the laser tube, if desired.

In use, the apparatus of the invention provides a method of obtaining improved discharge uniformity in a forced transport, electrically excited molecular gas laser having a large volume discharge in a gaseous medium at a pressure of at least 50 Torr by moving the gaseous lasing medium having a pressure of at least 50 Torr at high speed along a flow path, electrically exciting the moving gaseous medium along an active discharge length of the flow path to create a plasma for lasing, and rapidly expanding the moving gaseous medium in an expansion chamber provided along the flow path in the vicinity of the active discharge length of the flow path to stir the plasma and provide a uniform and stable discharge. This is accomplished without obstructing or reducing the cross sectional area of the gas flow path. Therefore, high gas flow rates with efficient cooling and high power output can be attained with uniform and stable mode characteristics.

While I have shown and described several embodiments in accordance with the present invention, it is understood that the same is not limited thereto, but is susceptible to numerous changes and modifications as known to those skilled in the art. Therefore, I do not wish to be limited to the details shown and described herein, but intend to cover all such changes and modifications as are encompassed by the scope of the appended claims.

I claim:

1. A forced transport, electrically excited molecular gas laser having a large volume discharge in a gaseous medium at a pressure of at least 50 Torr comprising a resonant optical cavity with means defining an at least essentially unobstructed flow path for a gaseous lasing medium flowing to and through said resonant optic cavity, gaseous lasing medium having a pressure of at least 50 Torr contained in said flow path, means for moving said gaseous lasing medium at high speed along said flow path, means for electrically exciting the moving gaseous medium along an active discharge length of said flow path to create a plasma for lasing, means for abstracting energy from said cavity, and wherein said means defining the flow path includes an at least essentially unobstructed expansion chamber in the vicinity of the active discharge length of said flow path for rapidly expanding said moving gaseous lasing medium to stir said plasma and provide a uniform and stable discharge.

2. A forced transport, electrically excited molecular gas laser according to claim 1, wherein said means defining a flow path for the gaseous lasing medium includes an elongated laser discharge tube with a bore for the passage of said gaseous lasing medium.

3. A forced transport, electrically excited molecular gas laser according to claim 2, wherein said expansion chamber is defined by an enlarged portion of said laser discharge tube bore located intermediate the ends of said tube.

4. A forced transport, electrically excited molecular gas laser according to claim 3, wherein said enlarged portion of said laser discharge tube bore has a cross sectional area of at least approximately six times that of the bore adjacent said enlarged portion for effecting said rapid expansion of the moving gaseous medium and stirring of the plasma.

5. A forced transport, electrically excited molecular gas laser according to claim 3, wherein said laser discharge tube includes a plurality of expansion chambers in the form of enlarged portions of the bore of said tube spaced along the length of said tube for periodically rapidly expanding the moving gaseous lasing medium to stir said plasma.

6. A forced transport, electrically excited molecular gas laser according to claim 5, wherein said laser discharge tube includes equipotential means in at least one of said expansion chambers, said equipotential means establishing a uniform electric field across said plasma.

7. A forced transport, electrically excited molecular gas laser according to claim 6, wherein said equipotential means includes an equipotential disc having a bore therethrough which is coaxial with the bore in said discharge tube.

8. A forced transport, electrically excited molecular gas laser according to claim 5, wherein said plurality of the expansion chambers in said laser discharge tube include equipotential means, and wherein at least two of said equipotential means are connected to radio frequency excitation means to electrically excite the gaseous medium moving in said discharge tube.

9. A forced transport, electrically excited molecular gas laser according to claim 2, wherein said means for electrically exciting the moving gaseous medium along an active discharge length of said flow path includes an anode and a cathode positioned in spaced relationship in said discharge tube along said flow path.

10. A forced transport, electrically excited molecular gas laser according to claim 9, wherein said expansion chamber is provided in the vicinity of said anode.

11. A forced transport, electrically excited molecular gas laser according to claim 10, wherein an additional expansion chamber is provided intermediate said anode and said cathode.

12. A forced transport, electrically excited molecular gas laser according to claim 10, wherein said anode includes a rod with one end of said rod extending into said expansion chamber whereby the expansion chamber is essentially unobstructed to permit the rapid expansion therein of the moving gaseous lasing medium.

13. A forced transport, electrically excited molecular gas laser according to claim 12, wherein anode support means are provided at an enlarged end portion of said elongated discharge tube for supporting said anode rod from its end opposite said one end.

14. A forced transport, electrically excited molecular gas laser according to claim 9, wherein said elongated discharge tube includes an inlet fitting extending transverse to the longitudinal direction of said discharge tube and defining an at least essentially unobstructed inlet bore portion for the passage of said gaseous lasing medium, said inlet bore portion communicating directly with said expansion chamber.

15. A forced transport, electrically excited molecular gas laser according to claim 9, wherein said cathode is an annular member which encircles said flow path, said cathode being removably mounted in an enlarged end portion of said discharge tube by cathode support means connected to an end of said discharge tube.

16. A forced transport, electrically excited molecular gas laser according to claim 1, wherein said means for moving said gaseous lasing medium along said flow path moves the gaseous lasing medium at a speed of at least 45 meters per second.

17. A forced transport, electrically excited molecular gas laser according to claim 1, wherein said expansion chamber of the flow path has a cross sectional area of at least approximately six times that of the adjacent flow path for effecting said rapid expansion of the moving gaseous medium and stirring of the plasma.

18. A forced transport, electrically excited molecular gas laser according to claim 1, wherein a plurality of said expansion chambers are provided along said active discharge length of the flow path for periodically expanding the moving gaseous lasing medium to stir said plasma whereby the active discharge length of said plasma may be increased with uniform and stable discharge.

19. A forced transport, electrically excited molecular gas laser according to claim 18, wherein said plurality of expansion chambers are separated by respective ones of a plurality of equipotential means for establishing a uniform electric field across said plasma.

20. A forced transport, electrically excited molecular gas laser according to claim 19, wherein at least two of said equipotential means are connected to radio frequency excitation means to electrically excite the gaseous medium moving along said flow path.

21. A forced transport, electrically excited molecular gas laser according to claim 1, wherein said expansion chamber has a bulbous internal configuration to enhance said stirring of the plasma.

22. A forced transport, electrically excited molecular gas laser having a large volume discharge in a gaseous medium comprising a resonant optic cavity with means defining an essentially unobstructed flow path for a gaseous lasing medium flowing to and through said resonant optical cavity, a gaseous lasing medium contained in said flow path, means for moving said gaseous lasing medium at high speed along said flow path, means for electrically exciting the moving gaseous medium along an active discharge length of said flow path to create a plasma for lasing in said resonant optic cavity, means for abstracting energy from said cavity, said means defining said flow path including enlarged portions of the flow path for receiving said electrical excitation means and further including an additional enlarged portion of the flow path in the form of an at least essentially unobstructed expansion chamber in the vicinity of the active discharge length of said flow path for rapidly expanding said moving gaseous medium to stir said plasma and provide a uniform and stable discharge.

23. A method of improving the discharge uniformity in a forced transport, electrically excited molecular gas laser having a large volume discharge in a gaseous medium at a pressure of at least 50 Torr comprising the steps of moving a gaseous lasing medium having a pressure of at least 50 Torr at high speed along a flow path, electrically exciting the moving gaseous medium along an active discharge length of said flow path to create a plasma for lasing, and rapidly expanding the moving gaseous lasing medium in an expansion chamber provided along said flow path in the vicinity of the active discharge length of said flow path to stir said plasma and provide a uniform and stable discharge, wherein the cross sectional area of said expansion chamber is at least six times that of the flow path adjacent said expansion chamber for effecting said rapid expansion and stirring of the plasma.

24. A method of improving the discharge uniformity in a forced transport, electrically excited molecular gas laser according to claim 23, wherein said step of rapidly expanding the moving gaseous lasing medium is performed at least at an intermediate location along said active discharge length.

25. A method of improving the discharge uniformity in a forced transport, electrically excited molecular gas laser having a large volume discharge in a gaseous medium at a pressure of at least 50 Torr comprising the steps of moving a gaseous lasing medium having a pressure of at least 50 Torr at high speed along a flow path, electrically exciting the moving gaseous medium along an active discharge length of said flow path to create a plasma for lasing, and rapidly expanding the moving gaseous lasing medium in an expansion chamber provided along said flow path in the vicinity of the active discharge length of said flow path to stir said plasma and provide a uniform and stable discharge, wherein said step of rapidly expanding the moving gaseous lasing medium is performed a plurality of times as the gaseous lasing medium moves along said active discharge length, and including the step of equalizing the electrical field across said plasma between rapid expansions of the moving gaseous lasing medium.

26. In a laser discharge tube for a forced transport, electrically excited molecular gas laser, said tube defining a bore as a flow path for a moving gaseous lasing medium with anode means and cathode means being provided in said tube for electrically exciting said gas to form a plasma for lasing over an active discharge length of said flow path, the improvement comprising an essentially unobstructed bulbous expansion chamber provided in said tube in the vicinity of the active discharge length of said flow path for rapidly expanding said moving gaseous lasing medium to stir said plasma and provide a uniform and stable discharge, the cross-sectional area of said expansion chamber being at least six times that of the flow path adjacent said expansion chamber for effecting said rapid expansion and stirring of the plasma.

27. A forced transport, electrically excited molecular gas laser having a large volume discharge in a gaseous medium comprising a resonant optical cavity with means defining an at least essentially unobstructed flow path for a gaseous lasing medium flowing to and through said resonant optical cavity, a gaseous lasing medium contained in said flow path, means for moving said gaseous lasing medium at high speed along said flow path, means for electrically exciting the moving gaseous medium along an active discharge length of said flow path to create a plasma for lasing in said resonant optic cavity, means for abstracting energy from said cavity, and wherein said means defining the flow path includes an at least essentially unobstructed expansion chamber in the vicinity of the active discharge length of said flow path for rapidly expanding said moving gaseous lasing medium to stir said plasma and provide a uniform and stable discharge, wherein said means defining a flow path for the gaseous lasing medium includes an elongated laser discharge tube with a bore for the passage of said gaseous lasing medium, wherein said means for electrically exciting the moving gaseous medium along an active discharge length of said flow path includes anode means and cathode means positioned in spaced relationship in said discharge tube along said flow path, wherein said expansion chamber is provided in the vicinity of said anode means, and wherein said anode means includes a rod with one end of said rod extending into said expansion chamber whereby the expansion chamber is essentially unobstructed to permit the rapid expansion therein of the moving gaseous lasing medium.

28. A method of improving the discharge uniformity in a forced transport, electrically excited molecular gas laser having a large volume discharge in a gaseous medium comprising the steps of moving a gaseous lasing medium at high speed along an essentially unobstructed flow path to and through a resonant optical cavity of said laser, electrically exciting the moving gaseous medium along an active discharge length of said flow path to create a plasma for lasing, and rapidly expanding the moving gaseous lasing medium in an at least essentially unobstructed expansion chamber provided along said essentially unobstructed flow path in the vicinity of the acitve discharge length of said flow path to stir said plasma and provide a uniform and stable discharge.

29. A method of improving the discharge uniformity in a forced transport, electrically excited molecular gas laser according to claim 28, wherein said step of rapidly expanding the moving gaseous lasing medium is performed a plurality of times as the gaseous lasing medium moves along said active discharge length including at an intermediate location along said active discharge length.

30. A method of improving the discharge uniformity in a forced transport, electrically excited molecular gas laser having a large volume discharge in a gaseous medium comprising the steps of moving a gaseous lasing medium at high speed along a flow path, electrically exciting the moving gaseous medium along an active discharge length of said flow path to create a plasma for lasing, and rapidly expanding the moving gaseous lasing medium in an at least essentially unobstructed expansion chamber provided along said flow path in the vicinity of the acitve discharge length of said flow path to stir said plasma and provide a uniform and stable discharge, wherein said step of rapidly expanding the moving gaseous lasing medium is performed a plurality of times as the gaseous lasing medium moves along said active discharge length, and including the step of equalizing the electrical field across said plasma between rapid expansions of the moving gaseous lasing medium.

31. A method of improving the discharge uniformity in a forced transport, electrically excited molecular gas laser according to claim 28, wherein the cross sectional area of said expansion chamber is at least six times that of the flow path adjacent said expansion chamber for effecting said rapid expansion and stirring of the plasma.

* * * * *